United States Patent [19]

De Lorme et al.

[11] 4,138,680
[45] Feb. 6, 1979

[54] SELECTIVE SAMPLING METHOD

[75] Inventors: James F. De Lorme, Paterson; Arthur R. Tuppen, Wayne, both of N.J.

[73] Assignee: International Telephone and Telegraph Corporation, Nutley, N.J.

[21] Appl. No.: 817,283

[22] Filed: Jul. 20, 1977

Related U.S. Application Data

[63] Continuation-in-part of Ser. No. 610,193, Sep. 4, 1975.

[51] Int. Cl.² .................................................. G01S 1/30
[52] U.S. Cl. .................................................. 343/105 R
[58] Field of Search ........................... 343/105 R, 109; 325/371, 323; 340/15.5 CP, 15.5 CF

[56] References Cited

U.S. PATENT DOCUMENTS

| | | | |
|---|---|---|---|
| 3,016,970 | 1/1962 | Allyn et al. | 340/15.5 CP X |
| 3,398,396 | 4/1968 | Embree | 340/15.5 |
| 4,015,262 | 3/1977 | Etcheverry et al. | 343/105 R |

*Primary Examiner*—Theodore M. Blum
*Attorney, Agent, or Firm*—John T. O'Halloran; Alfred C. Hill

[57] ABSTRACT

In an Omega receiver, for each of the Omega frequencies (10.2 KHz, 11 1/3 KHz, 13.6 KHz), a desired frequency is isolated by selectively sampling received signals at predetermined intervals. The samples are then processed such that samples corresponding to a desired frequency are additive and those corresponding to interferring signals cancel. Processing includes inverting certain samples and combining.

11 Claims, 4 Drawing Figures

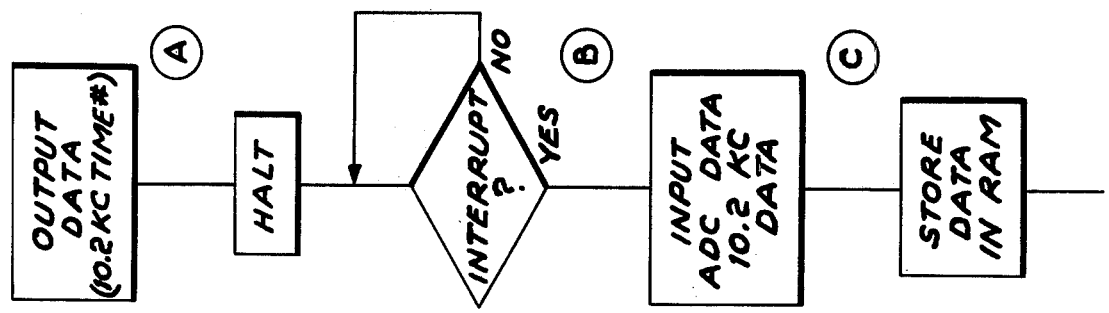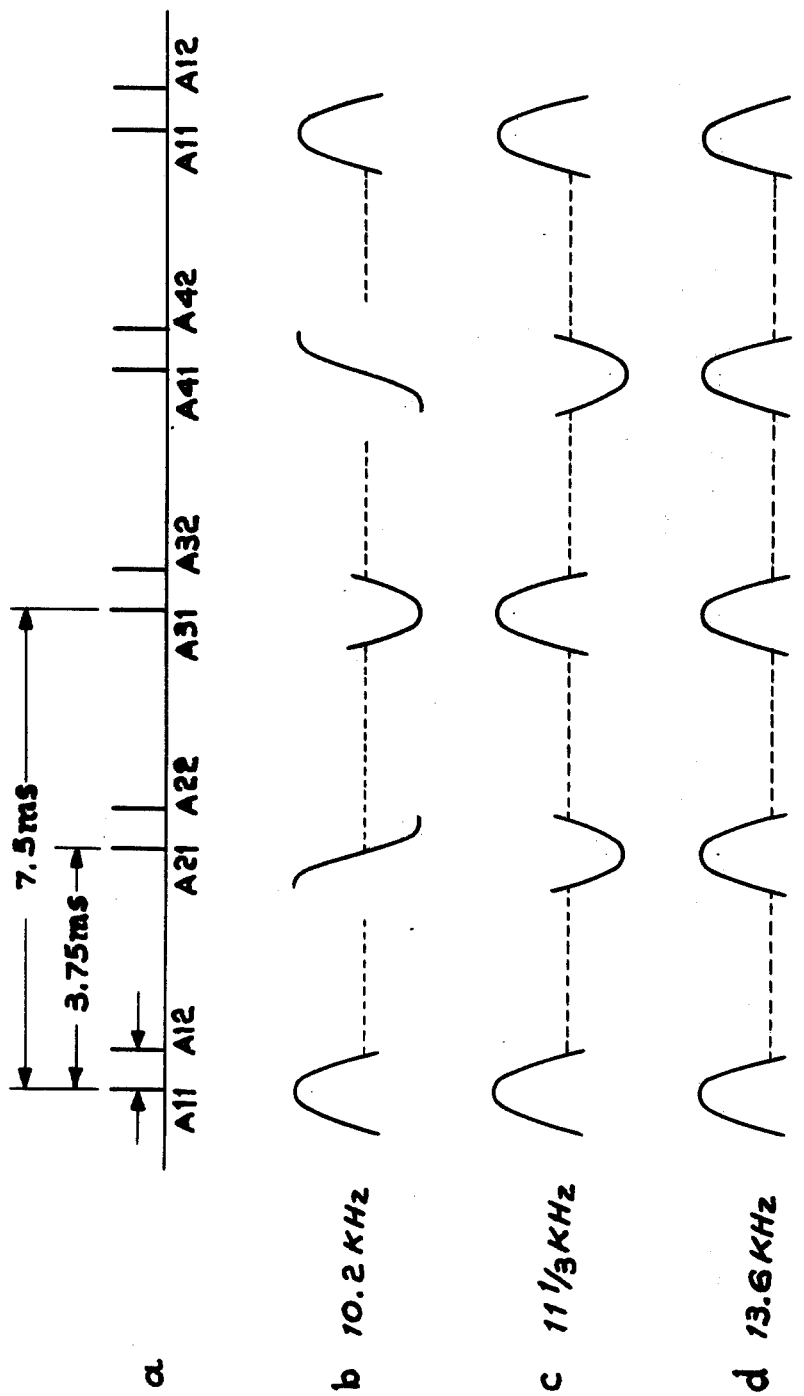

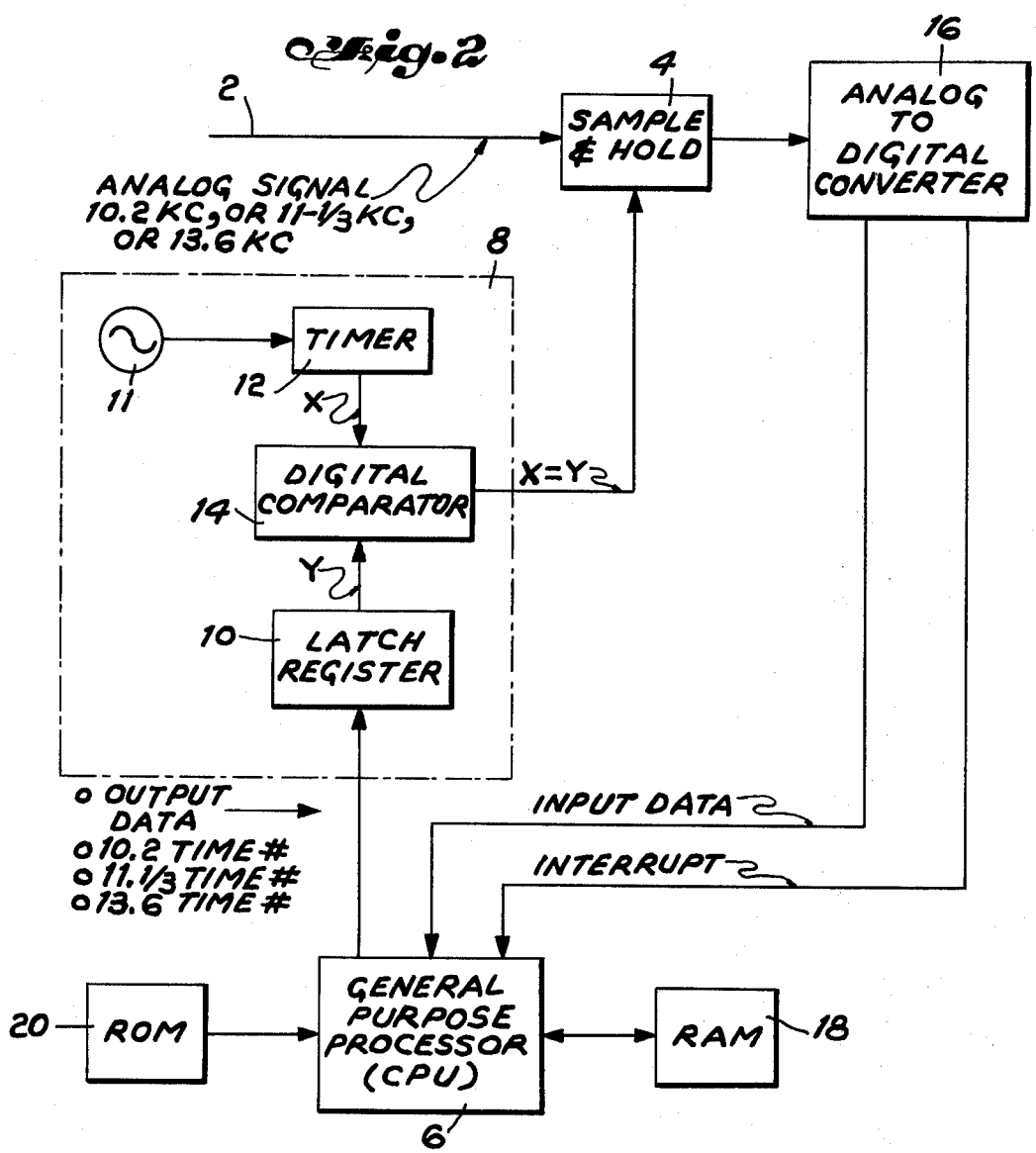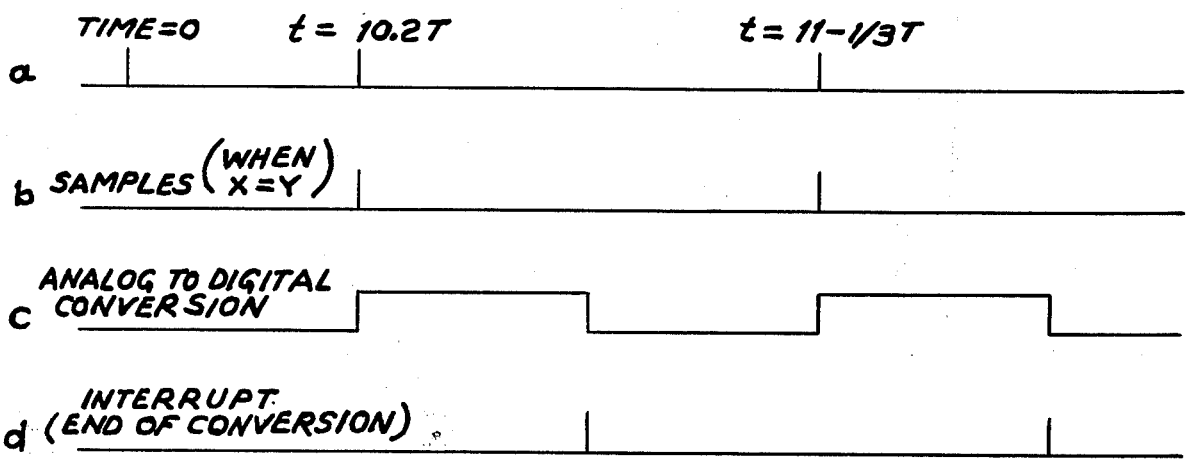

SELECTIVE SAMPLING METHOD

CROSS REFERENCE TO RELATED APPLICATIONS

This is a continuation-in-part of application, Ser. No. 610,193, filed Sept. 4, 1975, entitled, "Selective Sampling Method" and assigned to the assignee of the present invention.

BACKGROUND OF THE INVENTION

This invention relates generally to navigation techniques and, more particularly, to a method of reducing in-band interference in an Omega navigation receiver employing wide band filters.

It has been customary in the past to employ narrow bandwidth channel filters (approximately 100 Hz bandwidth) to provide adjacent channel rejection of the Omega received frequencies (10.2 KHz, 11⅓ KHz and 13.6 KHz). However, these filters, when driven by high level atmospheric noise pulses, will produce a pulse of approximately 14 to 20 milliseconds in width. Since there are many noise pulses spaced from 6 to 10 milliseconds apart, the noise pulses produced in the narrow band filters will overlap, resulting in no time during which clean Omega signals will be available.

It is known that improved performance can be obtained when wide band (1 KHz) channel filters are used in an environment of atmospheric noise. In this case, noise pulses produced in the filter do not overlap, and there is an appreciable amount of time available for receiving clean Omega signals between atmospheric noise pulses, which signals may then be measured and processed.

Experiments have been conducted comparing the performance of an Omega receiving system using, first, a 100 Hz bandwidth channel filter and, second, a 1000 Hz bandwidth channel filter. It was concluded, as a result of these experiments, that the use of a 1 KHz wide channel filter reduces the RMS deviation of a recorded phase measurement by an amount equivalent to improving the received carrier to noise ratio by approximately 10 dB.

The use of wide band channel filters, while reducing atmospheric noise interference presents the additional problem of strong interferring in-band signals. Since there are three basic Omega frequencies at 10.2, 11⅓ and 13.6 KHz, plus the possibility of additional frequencies between 11.55 and 13.15 KHz, plus transmissions in this band from other countries, there may exist an interferring signal which, depending on geographical location, can be as much as 60 dB stronger than the desired Omega signal. While it is true that the interferring signal will differ in frequency from the desired Omega signal, this type of interference must be overcome if a successful wide band operation is to be implemented.

SUMMARY OF THE INVENTION

It is an object of the present invention to provide a selective sampling technique for making optimum use of clean Omega signal periods present between high level atmospheric noise pulses.

It is a further object of the invention to reduce the above mentioned in-band interference by isolating the three basic Omega frequencies.

According to a broad aspect of the invention, there is provided a method of isolating a preselected signal having a first frequency from at least one interferring signal having a frequency different from said first frequency comprising the steps of: receiving said preselected and said at least one signal; sampling said preselected and said at least one signal at predetermined intervals such that the phase and amplitude of each sample with respect to previous samples is known; and combining the samples of said preselected and said at least one signal such that the samples of preselected signal are additive and those of said at least one signal cancelled.

The above and other objects of the present invention will be more clearly understood from the following detailed description taken in conjunction with the accompanying drawings in which:

BRIEF DESCRIPTION OF THE DRAWINGS

FIGS. 1a–1d are waveforms corresponding to the three Omega signals from which samples are taken and processed in accordance with the inventive method;

FIG. 2 is a block diagram of an apparatus for carrying out the inventive method;

FIG. 3 is a timing diagram for use in explaining the operation of the apparatus shown in FIG. 2; and FIG. 4 is a flowchart for use in explaining the operation of the apparatus shown in FIG. 2.

DESCRIPTION OF THE PREFERRED EMBODIMENT

A selective sampling technique is used to solve the Omega signal processing problem of in-band interference, phase measurement and impulse noise rejection with good dynamic range. This technique relies on the underlying integral harmonic relationship between the Omega frequencies, as will be described below. By periodically sampling the incoming signal and appropriate subsequent processing of the samples, frequency, phase and amplitude information may be extracted and interference and impulse noise rejected. Samples are taken in a manner which provides in-phase and quadrature data for each signal. Since all in-band frequencies are related to a sub-harmonic frequency, digital filtering will extract the desired frequency, as will be more fully described below. Table I illustrates the relationship of the Omega navigation frequencies in the form of cycles to time intervals. The corresponding timing relationships are shown in FIGS. 1a–1d.

TABLE I

| Omega Navigation Frequencies | Cycle/Time Interval | | | |
|---|---|---|---|---|
| 10.2 KHz: = | $\frac{102}{10 \text{ ms}}$ | $= \frac{153}{15 \text{ ms}}$ | $= \frac{76.5}{7.5 \text{ ms}}$ | $= \frac{38.25}{3.75 \text{ ms}}$ |
| 11⅓ KHz = | $\frac{340}{30 \text{ ms}}$ | $= \frac{170}{15 \text{ ms}}$ | $= \frac{85}{7.5 \text{ ms}}$ | $= \frac{42.5}{3.75 \text{ ms}}$ |
| 13.6 KHz: = | $\frac{136}{10 \text{ ms}}$ | $= \frac{204}{15 \text{ ms}}$ | $= \frac{102}{7.5 \text{ ms}}$ | $= \frac{51}{3.75 \text{ ms}}$ |

It can be seen from Table I that if samples of each of the three signals are taken every 7.5 milliseconds, samples of the 11⅓ KHz signals and the 13.6 KHz signals will occur at the same phase, while adjacent samples of the 10.2 KHz signal will be 180° out of phase. Likewise, if samples were taken every 3.75 milliseconds, adjacent samples of the 13.6 KHz signal will be in phase, adjacent samples of the 11⅓ KHz signal would be 180° out of phase and samples of the 10.2 KHz signal would be 90° out of phase.

To extract phase error information for the 10.2 KHz zero cross-over seeking tracking loop, the contributions of the 11⅓ KHz signal and the 13.6 KHz signal can be rejected as follows: Referring to FIGS. 1a–1d, it can be seen that phase quadrature samples are taken every 3.75 milliseconds. The first pair of samples are labeled $A_{11}$ and $A_{12}$. Likewise, the samples in the second pair are labeled $A_{21}$ and $A_{22}$, etc. Samples $A_{1n}$ and $A_{3n}$, where N=1 or 2, are 180° out of phase with respect to the 10.2 KHz signal. However, with respect to both the 11⅓ KHz and 13.6 KHz transmissions, the samples $A_{1n}$ and $A_{3n}$ are in phase (0° phase shift) as described above with reference to Table I. After four pairs of samples have been taken, every other pair is inverted and combined. As a result, the 10.2 KHz data is additive and the 11⅓ KHz and 13.6 KHz data is self-cancelling. Therefore, the 10.2 KHz data can be isolated by taking samples every 7.5 milliseconds, inverting every other one, and adding the sum of all resulting data. This sum will serve as the error input to the 10.2 KHz digital servo.

Carrying this process further, additional cancellations among the other two frequencies can be accomplished by sampling every 3.75 milliseconds. As stated previously, samples taken at this rate are 90° out of phase for the 10.2 KHz signal and 180° out of phase for the 11⅓ KHz signal. However, the samples will be in phase for the 13.6 KHz signal.

To isolate the 11⅓ KHz data and at the same time reject the 13.6 KHz data, a processor need only invert every other sample, thereby making the 11⅓ KHz data additive and the 13.6 KHz data self-cancelling. Further, while inverting every other sample spaced by 3.75 milliseconds, the sample spaced 7.5 milliseconds apart will continue to have the same phase relationship for the 11⅓ KHz signal and at opposite polarity (180° out of phase) for the 10.2 KHz data. Therefore, by inverting every other sample, the 11⅓ KHz data is additive and both the 10.2 and 13.6 KHz data is self-cancelling, as shown in equations 1, 2 and 3.

$$(A_{11} + A_{31}) + (A_{21} + A_{41}) = 4 (11⅓ \text{ KHz}) \quad (1)$$

$$0 (10.2 \text{ KHz}) + 0 (10.2 \text{ KHz}) = 0 \quad (2)$$

$$0 (13.6 \text{ KHz}) + 0 (13.6 \text{ KHz}) = 0 \quad (3)$$

Using the same techniques, the extraction of the 13.6 KHz data and the cancellation of the 10.2 and 11⅓ KHz components can be accomplished by summing every sample directly with no inversions, resulting in the required cancellation as shown in equations 4, 5 and 6.

$$(A_{11} + A_{31}) + (A_{21} + A_{41}) = 4 (13.6 \text{ KHz}) \quad (4)$$

$$0 (11⅓ \text{ KHz}) + 0 (11⅓ \text{ KHz}) = 0 \quad (5)$$

$$0 (10.2 \text{ KHz}) + 0 (10.2 \text{ KHz}) = 0 \quad (6)$$

As explained previously, the 10.2 KHz data can be extracted errorfree if samples are taken every 7.5 milliseconds and every other sample inverted. The same cancellation can be accomplished using the quadrature samples spaced 3.75 milliseconds apart as shown in FIGS. 1a–1d. Since in 3.75 milliseconds the 10.2 KHz carrier is ¼ of a cycle or 90° out of phase and further, since the automatic gain control system requires a quadrature strobe to control amplitude, it can be seen from FIG. 1 that the quadrature sample $A_{22}$ is 180° out of phase with sample $A_{11}$.

Therefore, samples $A_{11}$, $A_{22}$, $A_{31}$ and $A_{42}$ are never more than 180° out of phase. More exactly, $A_{11}$ and $A_{42}$ are in phase as are the $A_{22}$ and $A_{31}$ samples. The resulting data format for extracting the 10.2 $KH_z$ and rejecting the 11⅓ KHz and 13.6 KHz data is shown in equations 7, 8 and 9.

$$(A_{11} + A_{31}) + (A_{22} + A_{42}) = 4 (10.2 \text{ KHz}) \quad (7)$$

$$0 (11⅓ \text{ KHz}) + 0 (11⅓ \text{ KHz}) = 0 \quad (8)$$

$$0 (13.6 \text{ KHz}) + 0 (13.6 \text{ KHz}) = 0 \quad (9)$$

FIG. 2 is a block diagram of an apparatus for carrying out the above described method. Signals are received via antenna 2 and temporarily stored in sample and hold circuits 4. To begin the data acquisition process, general purpose processor 6 outputs the 10.2 KHz timing information to sample gate generator 8. More specifically, an electrical representation of the time at which the 10.2 KHz sample is expected is stored in latch register 10. This may consist of nothing more than a series of flip flops which stores in a parallel fashion a binary representation of the time at which the 10.2 KHz sample is expected. The general purpose processor 6 then goes into a standby mode.

Sample gate generator 8 contains an internal timer 11 and 12, the output of which is compared with the contents of latch register 10 in digital comparator 14. When a coincidence between the contents of timer 12 and latch register 10 occurs, a signal is generated by digital comparator 14 and applied to sample and hold circuits 4. This results in an analog-to-digital conversion of the contents of sample and hold circuit 4 in analog-to-digital converter 16.

When analog-to-digital conversion is complete, an interrupt signal is generated by the analog-to-digital converter and applied to general purpose processor 6. Likewise, the digital equivalent of the voltage at the point in time when the sample occured is transmitted to the general purpose processor 6 in the form of input data, which data is then stored in random access memory 18.

General purpose processor 6 nexts outputs to latch register 10 an electrical representation of the time at which the 11⅓ KHz sample is expected and the above described process is repeated. After the 11⅓ KHz data is stored in random access memory 18, the process is repeated for the 13.6 KHz data.

All of the instructions necessary for this data acquisition process are stored in read only memory 20. A flow chart for this portion of the software is shown in FIG. 4. Output data corresponding to the 10.2 KHz time is first generated by general purpose processor 6. The operation then halts and awaits an interrupt signal from analog-to-digital converter 16. When the interrupt signal is generated, analog-to-digital conversion of the input sample is complete and the converted data is applied to general purpose processor 6. This data is next stored in random access memory 18.

The flow chart shown in FIG. 4 corresponds to the software instructions necessary for the generation of the 10.2 KHz data during the data acquisition phase. It should be understood that this process is repeated for both the 11⅓ and 13.6 KHz data.

When sufficient data has been accumulated in random access memory 18, general purpose processor begins its computation phase under the control of instructions supplied by read only memory 20. These instructions correspond to those necessary to carry out the computation set forth above in equations 1 through 9.

FIG. 3 is a timing diagram illustrating the above operation. In line a of FIG. 3, between time t=0 and t=10.2, samples are being received via antenna 2. At time t=10.2, a signal is generated by digital comparative 14 and applied to sample and hold circuit 4. This initiates the analog-to-digital conversion as shown in line c of FIG. 3. At the end of the digital conversion, an interrupt signal is generated, shown in line d of FIG. 3. This interrupt signal indicates the end of the analog-to-digital conversion. After the interrupt signal, data is transferred from analog-to-digital converter 16 to general purpose processor 6 subsequently to random access memory 18. Then, as shown in FIG. 3, the process is repeated for the 11⅓ KHz data.

It is to be noted that general purpose processor 6 may comprise a single integrated circuit of types which are commercially available. For example, Intel Corporation, Santa Clara, California manufactures an 8080 high performance, n-channel, 8-bit single chip microprocessor which will perform all the requirements called for herein.

By the above described arrangement, general purpose processor 6 assures that samples are taken at the correct time in accordance with the above described method, and further the processor performs whatever conversions or combinations of samples are required to carry out the above described method. By selectively decoding the sample data, any of the three frequencies may be extracted, while interference effects from the two remaining frequencies are completely cancelled.

While the principles of this invention have been described above in connection with specific apparatus, it is to be understood that this is made only by way of example and not as a limitation in the scope of the invention as set forth in the objects and features above and in the accompanying claims.

What is claimed is:

1. A method of isolating a preselected signal having a first frequency from at least one interferring signal having a frequency different from said first frequency comprising the steps of:
   receiving said preselected and said at least one signal;
   sampling said preselected and said at least one signal at predetermined intervals such that the phase and amplitude of each sample with respect to previous samples is known; and
   combining the samples of said preselected and said at least one signal are such that the samples of preselected signal are additive and those of said at least one signal cancelled.

2. A method according to claim 1 further including the step of inverting predetermined ones of said samples.

3. A method according to claim 1 wherein the sampling of said preselected and at least one signal produces pairs of phase quadrature samples, each pair separated by said predetermined interval.

4. A method according to claim 3 wherein said preselected signal has a frequency of 10.2 KHz and said at least one signal has a frequency of 11⅓ KHz and wherein the first pulse of adjacent pulse pairs taken every 7.5 milliseconds are inverted and added.

5. A method according to claim 3 wherein said preselected signal has a frequency of 10.2 KHz and said at least one signal has a frequency of 13.6 KHz and wherein the first pulse of adjacent pulse pairs taken every 7.5 milliseconds are inverted and added.

6. A method according to claim 3 wherein said preselected signal has a frequency of 11⅓ KHz and said at least one signal has a frequency of 10.2 KHz and wherein alternate first pulses of each pulse pair taken every 3.75 milliseconds is inverted and combined with previous inverted and non-inverted samples.

7. A method according to claim 3 wherein said preselected signal has a frequency of 11⅓ KHz and said at least one signal has a frequency of 13.6 KHz and wherein alternate first pulses of each pulse of each pulse pair taken every 3.75 milliseconds is inverted and combined with previous inverted and non-inverted samples.

8. A method according to claim 3 wherein said preselected signal has a frequency of 13.6 KHz and said at least one signal has a frequency of 10.2 KHz and wherein samples taken every 3.75 milliseconds are added.

9. A method according to claim 3 wherein said preselected signal has a frequency of 13.6 KHz and said at least one signal has a frequency of 11⅓ KHz and wherein samples taken every 3.75 milliseconds are added.

10. A method according to claim 3 wherein said preselected signal has a frequency of 10.2 KHz and said at least one signal has a frequency of 11⅓ KHz and wherein the first pulse of every other pulse pair and the second pulse of every other intervening pulse pairs are inverted and combined.

11. A method according to claim 3 wherein said preselected signal has a frequency of 10.2 KHz and said at least one signal has a frequency of 13.6 KHz and wherein the first pulse of every other pulse pair and the second pulse of every other intervening pulse pairs are inverted and combined.

* * * * *